United States Patent
Sundar et al.

(10) Patent No.: US 9,311,084 B2
(45) Date of Patent: Apr. 12, 2016

(54) RDA CHECKPOINT OPTIMIZATION

(71) Applicant: Apple Inc., Cupertino, CA (US)

(72) Inventors: Shyam Sundar, Sunnyvale, CA (US); Conrado Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 13/955,847

(22) Filed: Jul. 31, 2013

(65) Prior Publication Data

US 2015/0039860 A1    Feb. 5, 2015

(51) Int. Cl.
  *G06F 9/06*   (2006.01)
  *G06F 9/30*   (2006.01)
  *G06F 9/38*   (2006.01)

(52) U.S. Cl.
  CPC ............ *G06F 9/30032* (2013.01); *G06F 9/384* (2013.01); *G06F 9/3838* (2013.01); *G06F 9/3863* (2013.01)

(58) Field of Classification Search
  CPC ....................................................... G06F 9/06
  See application file for complete search history.

(56) References Cited

U.S. PATENT DOCUMENTS

| | | | |
|---|---|---|---|
| 6,356,918 B1* | 3/2002 | Chuang ................. | G06F 9/3836 |
| 2008/0077777 A1* | 3/2008 | Lataille .................. | G06F 9/384 |
| | | | 712/217 |
| 2013/0275720 A1* | 10/2013 | Keller .................... | G06F 9/384 |
| | | | 712/205 |
| 2013/0339671 A1* | 12/2013 | Williams, III ...... | G06F 9/30043 |
| | | | 712/217 |

* cited by examiner

*Primary Examiner* — Cheng-Yuan Tseng
(74) *Attorney, Agent, or Firm* — Rory D. Rankin; Meyertons, Hood, Kivlin, Kowert & Goetzel, P.C.

(57) ABSTRACT

A system and method for efficiently performing microarchitectural checkpointing. A register rename unit within a processor determines whether a physical register number qualifies to have duplicate mappings. Information for maintenance of the duplicate mappings is stored in a register duplicate array (RDA). To reduce the penalty for misspeculation or exception recovery, control logic in the processor supports multiple checkpoints. The RDA is one of multiple data structures to have checkpoint copies of state. The RDA utilizes a content addressable memory (CAM) to store physical register numbers. The duplicate counts for both the current state and the checkpoint copies for a given physical register number are updated when instructions utilizing the given physical register number are retired. To reduce on-die real estate and power consumption, a single CAM entry is stores the physical register number and the other fields are stored in separate storage elements.

14 Claims, 11 Drawing Sheets

RDA CHECKPOINT OPTIMIZATION

BACKGROUND OF THE INVENTION

1. Field of the Invention

This invention relates to microprocessors, and more particularly, to efficiently performing micro architectural checkpointing.

2. Description of the Relevant Art

Microprocessors typically include overlapping pipeline stages and out-of-order execution of instructions. Additionally, microprocessors may support simultaneous multithreading and speculative execution to increase throughput. These techniques take advantage of instruction level parallelism (ILP) in source code. However, control dependencies and data dependencies reduce maximum throughput of the microprocessor. In addition, as the speculative instruction window size increases, the penalty for misprediction recovery also increases.

Regarding data dependencies, the data dependencies may appear either between operands of subsequent instructions in a straight line code segment or between operands of instructions belonging to subsequent loop iterations. Register renaming is used to allow parallel execution of instructions despite the WAR and WAW dependencies. However, the true dependency, or RAW dependency, is still intact. Therefore, architectural registers repeatedly used as a destination register and subsequently as a source register cause serialization of instruction execution for associated source code segments.

One example of a common RAW dependency with an architectural register is an assignment performed with a move operation. The move operations may frequently occur within subroutines used to reduce the cost of developing large, reliable programs. Subroutines are often collected into libraries and used for sharing software. Regarding the penalty with misprediction recovery, as the instruction window increases, the penalty to restart and re-execute instructions increases. In addition, maintaining the state of critical resources within the processor may become complex and expensive.

In view of the above, efficient methods and mechanisms for efficiently performing microarchitectural checkpointing are desired.

SUMMARY OF EMBODIMENTS

Systems and methods for efficiently performing microarchitectural checkpointing. In one embodiment, a processor includes a register rename unit configured to receive decoded instructions and determine whether a decoded given instruction is a move operation. This move operation may qualify to consume zero execution cycles. Examples of qualifiers may be the move operation is a register-to-register move operation and support exists for maintaining a duplicate count of mappings for a given rename register identifier (ID) or physical register number. If the determination is true, the register rename unit may assign a physical register number associated with a source operand of the given instruction to the destination operand of the given instruction.

Continuing with the move operation consuming zero cycles, each architectural register associated with the source operand and the destination operand may now be mapped to a same physical register number. In addition, control logic within the register rename unit may mark the given move instruction to prevent it from proceeding in the processor pipeline. For example, the control logic may mark the given move instruction to indicate completion at the dispatch pipeline stage.

In addition, the register rename unit may cause the value of the physical register number used for both the source and the destination operands to be bypassed to one or more instructions that are both younger in-program-order than the given move instruction and have a data dependency on the given move instruction. The duplication of the mappings of the physical register number is maintained in a data structure. This data structure may be referred to as a register duplication array (RDA).

In various embodiments, the processor includes control logic to support microarchitectural checkpointing. The control logic uses checkpoint events. An example of a checkpoint event may be a given number of instructions have passed through a given pipeline stage since a last checkpoint event. When a checkpoint event is reached, the control logic creates a snapshot of the processor by saving the current state of various data structures. The RDA may be one of multiple data structures to have its state saved. Multiple checkpoints may be created during execution of one or more computer programs. Later, when a speculative misprediction or an exception is detected, the control logic selects a given checkpoint or snapshot. The control logic utilizes the information stored in the snapshot to recover the architectural state. The control logic may restart instruction processing at that point. Alternatively, the control logic may perform additional recovery or "rewind" at that point before restarting instruction processing.

One or more data structures utilize a content addressable memory (CAM). Each entry of the RDA stores at least a valid field, a physical register number, and a duplicate count corresponding to the physical register number. The physical register number is stored in a CAM. The checkpoint information stores copies of the state of these fields at particular points-in-time. However, the duplicate counts for both the current state and the checkpoint copies for a given physical register number are updated when instructions utilizing the given physical register number are retired. Rather than utilize additional CAM entries for the given physical register number to perform the multiple updates of the duplicate count, a single CAM entry is used and the other fields are stored in separate storage elements. A hit on the single CAM entry selects the multiple entries storing the checkpoint copies for the given physical register number. A selection of a given one of the multiple entries may be performed with the hit information, the valid field, and checkpoint number. Utilizing a single CAM entry for each physical register number reduces both on-die real estate and power consumption for supporting checkpointing of the duplicate mappings of the physical register numbers.

These and other embodiments will be further appreciated upon reference to the following description and drawings.

Figure 1:
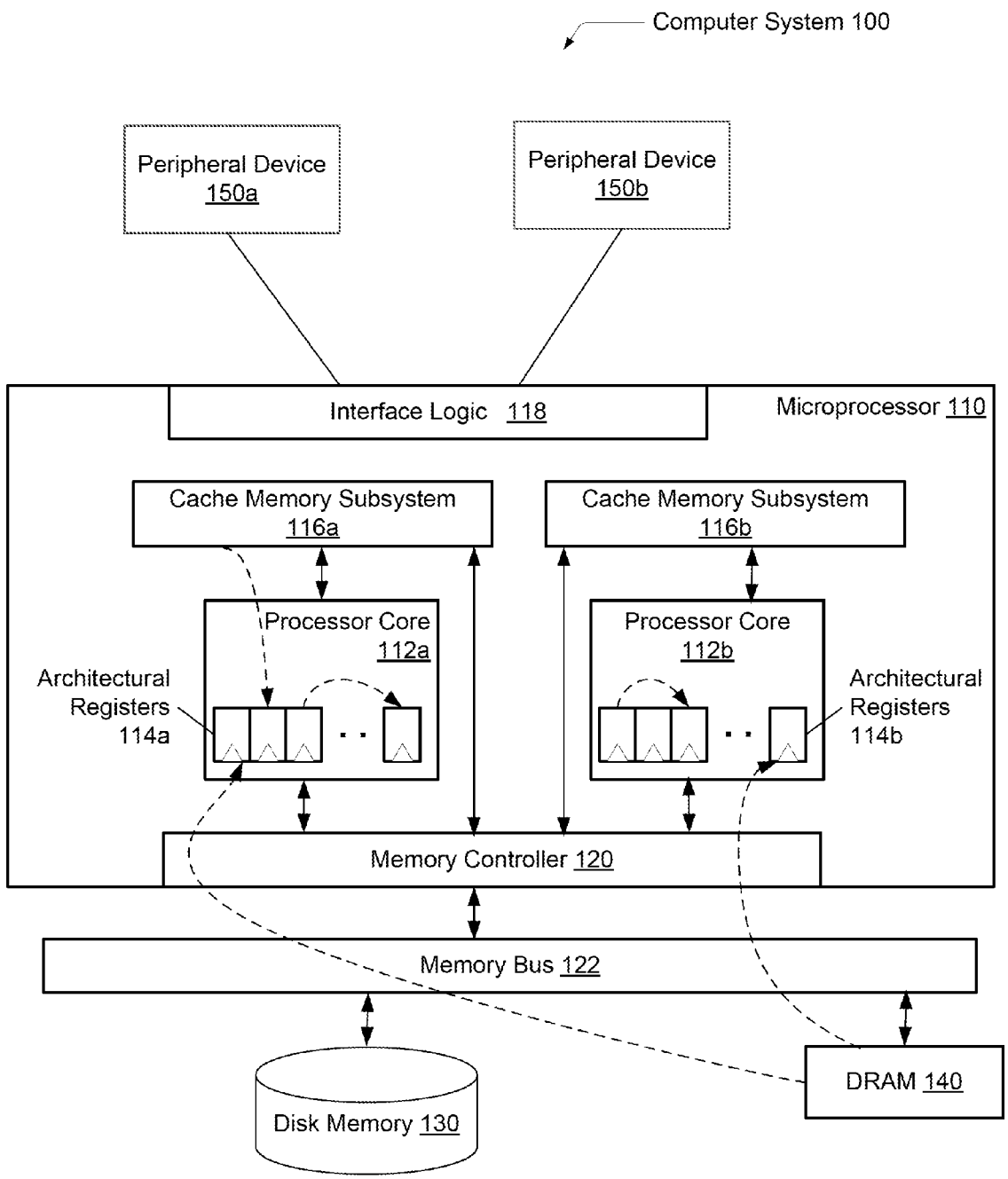
FIG. 1 is a generalized block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram of one embodiment of a computer system 100 is shown. As shown, microprocessor 110 may be connected to one or more peripheral devices 150a-150b, and external computer memory, such as disk memory 130 and dynamic random access memory (DRAM) 140. The disk memory 130 may store an operating system (OS) for the computer system 100. Instructions of a software application may be loaded into one or more of the cache memory subsystems 116a-116b within the microprocessor 110. The software application may have been stored in one or more of the disk memory 130, the DRAM 140 and one of the peripheral devices 150a-150b.

One or more of the processor cores 112a-112b may load the software application instructions from one of an associated cache memory subsystems 116a-116b and process the instructions. Generally speaking, when software programmers write applications to perform work according to an algorithm or a method, the programmers utilize variables to reference temporary and result data. This data utilizes space allocated in computer memory. The operating system allocates regions of memory for the software application.

During processing of the application, the data may be loaded from the allocated regions of memory into one or more of the cache memory subsystems 116a-116b. Subsequently, one or more of the architectural registers 114a-114b within the processor cores 112a-112b are used to load and store the temporary and result data. The architectural registers 114a-114b are architecturally visible registers that a software programmer and/or a compiler may identify within the software application. The architectural registers 114a-114b are associated with a given instruction set architecture (ISA). The hardware in the processor cores 112a-112b includes circuitry for processing instructions according to the given ISA. The hardware circuitry includes at least an associated set of architectural registers 114a-114b, functional units, pipeline staging elements and control logic. The ARM instruction set architecture may be selected for the given ISA. Alternatively, the Alpha, PowerPC, SPARC, MIPS, x86, or any other ISA may be selected.

The given ISA may be used to select a manner for declaring and allocating regions of memory. The given ISA may further determine a selected addressing mode used to transfer data between the microprocessor 110, including the architectural registers 114a-114b, and memory locations in one or more of the disk memory 130, the DRAM 140 and the peripheral devices 150a-150b. A load instruction is typically used to transfer data between memory and the microprocessor 110. A move instruction is used to transfer data between the architectural registers 114a within the processor core 112a. Similarly, a move instruction is used to transfer data between the architectural registers 114b within the processor core 112b.

The dashed lines shown in the computer system 100 indicate a few examples of the data transfers performed by move and load operations. A given ISA may have a number of different move instructions. Depending on whether the software application is in a 16-bit or 32-bit code segment and whether an override instruction prefix is used, a move operation may transfer 8-bits, 16-bits, 32-bits or 64-bits of data. A significant percentage of the assembly language instructions used to implement the software programmer's application may include these move operations.

The mnemonic mov for the move instruction is a slight misnomer. Generally, the mov instruction does copy data from one location to another. For example, the mov instruction creates a copy of the data content in a first location specified by a source operand and writes this data content to a second location specified by a destination operand. However, the first location specified by the source operand does not become empty or invalid. The data content originally stored in the second location specified by the destination operand is generally overwritten during the execution of the mov instruction. However, as described later, the data content originally stored in the second location specified by the destination operand may not be overwritten when the mov instruction is converted to a zero cycle move operation. Rather, the destination operand may be assigned a renamed register number (or any other suitable identifier) that is also used by the source operand. Further details are provided below.

In addition to out-of-order issue of instructions to execution units within a superscalar microarchitecture, each of the processor cores 112a-112b may perform speculative execution and register renaming to increase throughput. Each of the processor cores 112a-112b may include a set of physical registers larger than a set of integer and floating-point architecturally visible registers, such as sets 114a and 114b. Using hardware, each of the processor cores 112a-112b dynamically renames an architectural register identifier used for a source operand. Similarly, the hardware dynamically renames an architectural register identifier used for a destination operand. The renaming may occur after instruction decode. When a source operand is renamed, a previously used physical register number may be mapped to the source operand if that mapping is still valid. Otherwise, a new physical register number from a free list may be mapped to the source operand. When a destination operand is renamed, a new physical register number from the free list is used. When an instruction commits, a physical register storing the instruction destination value becomes a candidate to return to the free list.

When the hardware renames an architectural register identifier (ID) with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier (ID) may be referred to as a physical register number. The physical register number used to rename an architectural register number may also be referred to as a rename register number.

In one embodiment, each of the processor cores 112a-112b includes control logic that determines a given move instruction includes architectural register identifiers both for a source operand and a destination operand. The given move instruction includes architectural register identifiers for the operands rather than an immediate value or an address for a memory location. In response to this determination, the control logic may assign a given rename register number associated with the source operand of the given move instruction to the destination operand of the given move instruction. Each of the source operand and the destination operand are now mapped to a same rename register number. In addition, the control logic may mark the given move instruction to prevent it from proceeding in the pipeline of the processor core. For example, the control logic may mark the given move instruction to indicate completion at the dispatch pipeline stage.

Continuing with implementing the given move instruction as a zero cycle operation, the value of the rename register number used for both the source and the destination operands may also be bypassed to one or more instructions younger in program order than the given move instruction. These one or more younger instructions may be in a same rename group as the given move instruction and be dependent on the given move instruction. The actions of assigning a same rename register number to both the source and the destination operand of the given move instruction and bypassing this rename register number to younger, dependent instructions creates duplicate mappings in the mapping table. This rename register number represents two or more architectural registers.

The control logic may store the multiple mappings for the rename register number. Additionally, the control logic may store a duplicate count for the rename register number. This duplicate count may include the number of times any given architectural register number has been mapped to the rename register number. In various embodiments, the duplicate count may not be incremented for a mapping when a particular architectural register is already mapped to the rename register number at the time of the mapping. Further details and examples of this occurrence are provided later. A data structure referred to as a register duplication array (RDA) may be used for storing both the rename register number and the associated duplicate count. In one embodiment, the RDA may be implemented as a relatively small, tagged, fully-associative structure.

The RDA may have any number of entries for storing a rename register number and an associated duplicate count. The number of entries may be determined with simulations of typical applications. For example, an effective size of the RDA may be 8 entries. However, other numbers of entries may be possible and chosen. In one example, an implementation of an ISA may include 192 physical register numbers, and thus, an 8-bit physical register index may be both stored in an entry of the RDA and used to access the RDA. Simulations of typical applications may also determine a duplicate count size. In one embodiment, each duplicate count size is 5 bits. Therefore, a maximum number of duplications for a given physical register number is 31. However, another duplicate count size may be possible and chosen.

The RDA or other data structure storing the duplicate information for physical register numbers may be updated before or at the time of instruction dispatch in the processor pipeline. When the control logic determines a decoded instruction is a register-to-register move instruction, the RDA may be accessed to determine whether an entry already exists for the physical register number to be used to rename each of the source operand and the destination operand. If an entry exists, then the associated duplicate count may be incremented each time any given architectural register currently not mapped to the given rename register number is mapped to the given rename register number. Therefore, the duplicate count may be incremented by one or two during the update. If an entry does not already exist in the RDA, then an entry may be allocated and the associated duplicate count may be initiated at two.

The RDA or other data structure storing the duplicate information for physical register numbers may also be updated during a commit pipe stage in the processor pipeline. The duplicate count may be decremented each time the physical register number is ready to return to the free list for any given architectural register during an instruction commit. Again, the physical register number may also be referred to as the rename register number. A physical register number may be a candidate to return to the free list in response to an entry in the mapping table associated with the physical register number is removed or invalidated due to the instruction commit. In one embodiment, in response to the duplicate count decreasing to one, the duplicate count and the duplicate mappings may no longer be stored.

In one embodiment, in response to a given rename register number is a candidate to return to the free list during an associated instruction commit, and no associated duplicate information is stored, such as in the RDA or another data structure, the rename register number is returned to the free list. In another embodiment, in response to a given rename register number is a candidate to return to the free list and the stored duplicate count in the RDA or another data structure is decremented by one to zero, the rename register number is returned to the free list.

In one embodiment, in response to a given rename register number is a candidate to return to the free list and the stored duplicate count is decremented by one to a value greater than one, the rename register number is not returned to the free list.

The rename register number still has duplicate mappings to multiple architectural registers in this last case. In one embodiment, the RDA is checked for every zero-cycle move candidate to make sure there is an entry free for tracking a duplicate. If there is not an entry free for allocation within the RDA, then the move instruction is dispatched according to its opcode in a typical manner rather than the move instruction is converted into a zero-cycle move operation. Similarly, if an allocated entry exists for the zero-cycle move candidate, but the duplicate count is already saturated, then the move instruction is dispatched according to its opcode in a typical manner rather than the move instruction is converted into a zero-cycle move operation. Before continuing with further details regarding the conversion of mov instructions to zero-cycle move operations, a further description of the components in the computer system 100 is provided.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA as described earlier. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

Each of the cache memory subsystems 116a-116b may reduce memory latencies for a respective one of the processor cores 112a-112b. In addition, one or more shared cache memory subsystems may be used. A reduced miss rate achieved by the additional memory provided by the cache memory subsystems 116a-116b helps hide the latency gap between a given one of the processor cores 112a-112b and the off-chip memory.

If a cache miss occurs, such as a requested block is not found in a respective one of the cache memory subsystems 116a-116b, then a read request may be generated and transmitted to the memory controller 120. The memory controller 120 may translate an address corresponding to the requested block and send a read request to the off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 140 may be filled with data from the off-chip disk memory 130.

The off-chip disk memory 130 may provide a non-volatile, random access secondary storage of data. In one embodiment, the off-chip disk memory 130 may include one or more hard disk drives (HDDs). In another embodiment, the off-chip disk memory 130 utilizes a Solid-State Disk (SSD).

The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory. The off-chip DRAM 140 may include a multi-channel memory architecture. This type of architecture may increase the transfer speed of data to the memory controller 120 by adding more channels of communication between them.

Although only two peripheral devices are shown in the computer system 100 for illustrative purposes, another number of peripheral devices may be connected to the microprocessor 110. One or more of the peripheral devices 150a-150b may be a display including a modern TV or a computer monitor. The computer monitor may include a thin film transistor liquid crystal display (TFT-LCD) panel. Additionally, the display may include a monitor for a laptop and other mobile devices. A video graphics subsystem may be used between the display and the microprocessor 110. The video graphics subsystem may be a separate card on a motherboard and include a graphics processing unit (GPU). One or more of the peripheral devices 150a-150b may be one of a typically utilized input/output device such as a keyboard, mouse, printer, modem, and so forth.

Generally speaking, when a software application is compiled for execution on the microprocessor 110, the application may comprise multiple processes. Each process may own its own resources such as an image of memory, or an instance of instructions and data before application execution. Additionally, each process may include process-specific information such as an address space that addresses the code, data, and possibly a heap and a stack.

Figure 2:
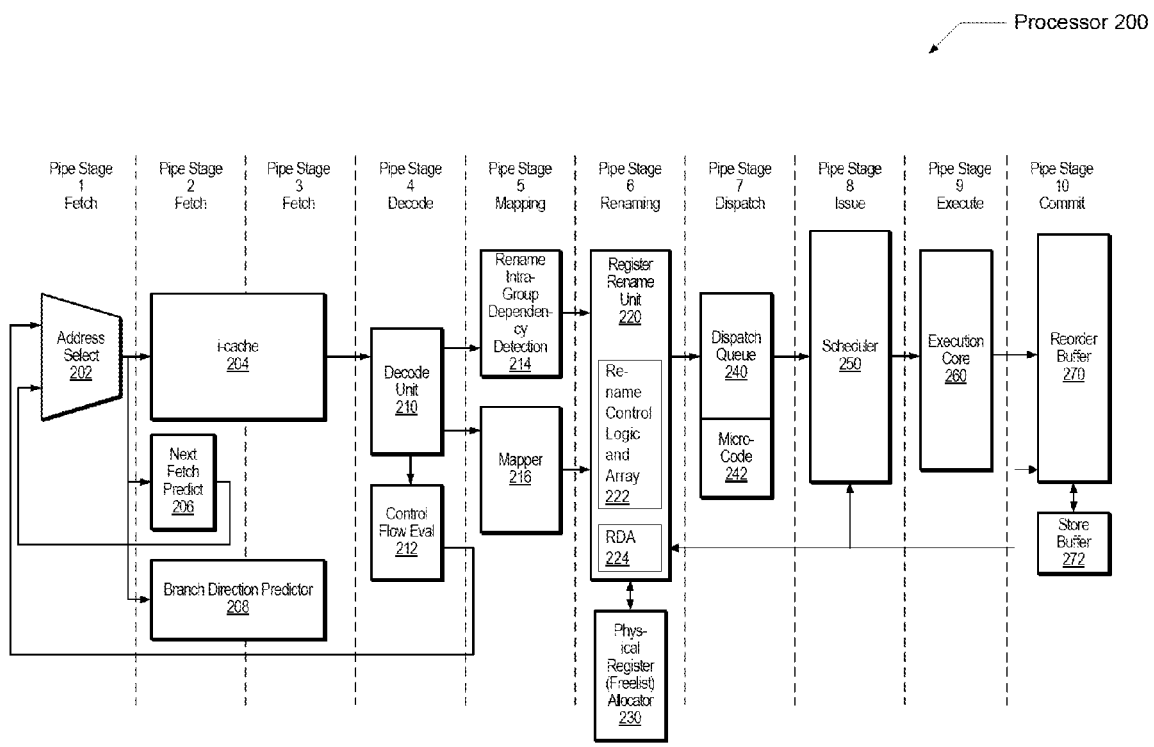
FIG. 2 is a generalized block diagram illustrating one embodiment of a processor core that performs superscalar, out-of-order execution with zero cycle move operations.

Referring now to FIG. 2, a generalized block diagram illustrating one embodiment of a processor core 200 that performs superscalar, out-of-order execution with zero cycle move operations is shown. The processor core 200 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction-cache (i-cache) 204 may store instructions for a software application. One or more instructions indicated by an address conveyed by address select logic 202 may be fetched from the i-cache 204. Multiple instructions may be fetched from the i-cache 204 per clock cycle if there are no i-cache misses. The address may be incremented by a next fetch predictor 206. A branch direction predictor 208 may be coupled to each of the next fetch predictor 206 and the control flow evaluation logic 212 in a later pipeline stage. The predictor 208 may predict information of instructions that change the flow of an instruction stream from executing a next sequential instruction.

The decode unit 210 decodes the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. In one embodiment, the control flow evaluation block 212 may alter fetch of instructions in the address selector 202. For example, an absolute address value associated with an unconditional branch opcode may be sent to the address selector 202.

Rename intra-group dependency detection logic 214 may find dependencies among instructions decoded by the decode unit 210. An intra-group of instructions may include decoded instructions from one or more clock cycles, or pipe stages.

Dependencies such as write-after-read (WAR), write-after-write (WAW) and read-after-write (RAW) may be detected. Dependency vectors that indicate dependencies between instructions may be generated. The mapper 216 may divide instructions among distributed hardware resources using factors such as available concurrency, criticality of dependence chains, and communication penalties.

The register rename unit 220 may include rename control logic and array 222 and register duplication array (RDA) 224. The register rename unit 220 may determine which physical register numbers to use to rename architectural register numbers used in both destination and source operands within instructions. The register rename unit may select candidate physical register numbers from the freelist allocator 230 or a rename mapping table within the rename control logic 222. The register rename unit may determine a given move instruction qualifies to be converted to a zero cycle move operation as described earlier. The register rename unit 220 may assign the destination operand a same rename register number as used for the source operand. Additionally, the register rename unit 220 may mark the move instruction in a manner to prevent it from proceeding for instruction execution. For example, the register rename unit 220 may mark the move instruction as complete at dispatch.

After instructions have been decoded and renamed, associated entries may be allocated in the dispatch queue 240. Instructions and associated renamed identifiers, program counter (PC) values, dependency vectors, markings for completion, and so forth may be sent to the dispatch queue 240 and later to the scheduler 250. Various exceptions may be detected, such as by the execution core 260. Examples include protection exceptions for memory accesses, no address translation, and so forth. The exceptions may cause a corresponding exception handling routine to be executed, such as by the microcode 242.

The scheduler 250 may schedule instructions for execution in the execution core 260. When operands are available and hardware resources are also available, an instruction may be issued out-of-order from the scheduler 250 to one of the functional units within the execution core 260. The scheduler 250 may read its source operands from an architectural register file (not shown) after translating renamed identifiers with a mapping table or from operand bypass logic. The source operands may be provided to the execution core 260.

The execution core 260 may include a load/store unit. The load/store unit may be connected to a data cache (not shown) and the store buffer 272 either directly or through the reorder buffer (rob) 270. The processor 200 may include a translation look-aside buffer (TLB) for each of the i-cache 204 and the data cache to avoid a cost of performing a full memory translation when performing a cache access. The store buffer 272 may store addresses corresponding to store instructions.

The rob 270 may receive results from the execution core 260. In addition, results may be bypassed to previous pipeline stages for data forwarding to dependent instructions already in the pipeline. The rob 270 may ensure in-order commit and retirement of instructions. When a move instruction is a candidate for commit, the rob 270 may send an indication to the register rename unit 220. The register rename unit 220 may determine whether an associated renamed register number is duplicated and whether the renamed register number is to be returned to the free list 230.

A duplicate count for duplicated renamed register numbers may be maintained within the register rename unit 220. Incrementing and decrementing of the duplicate count may occur as described earlier. The processor 200 may support multiple checkpoints. Each checkpoint may store information as a snapshot of the processor at a given point-in-time. The stored information may include state information of one or more data structures within the processor 200. For example, the architectural register file (not shown), the rob 270, the RDA 224, prediction data structures for branches and load/store instructions, and other data structures may have copies of state stored at particular points-in-time. Therefore, when a speculative misprediction or an exception is detected, control logic within the processor 200 is able to select a given checkpoint or snapshot. The control logic utilizes the information stored in the snapshot to recover the architectural state and restart instruction processing at that point.

Figure 3:
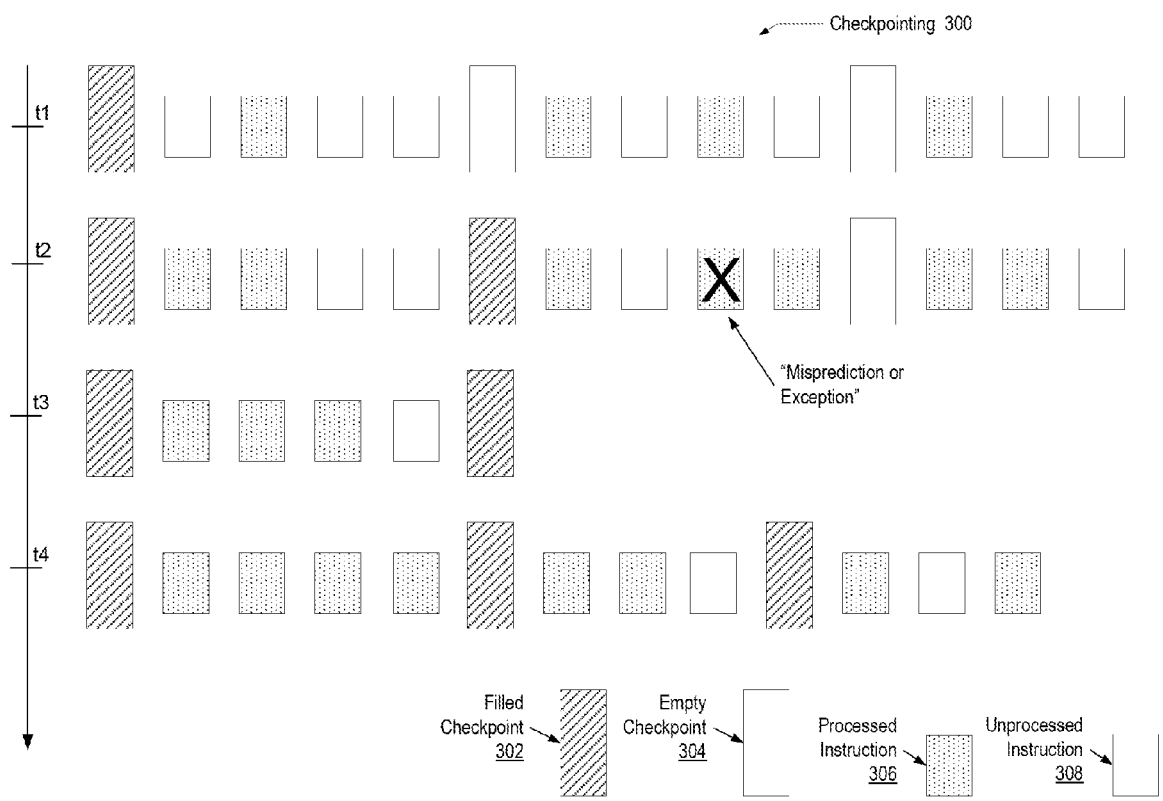
FIG. 3 is a generalized block diagram of one embodiment of microarchitectural checkpointing.

Turning now to FIG. 3, a generalized block diagram of one embodiment of checkpointing 300 is shown. In FIG. 3, the duration of time is shown from the top to bottom of the diagram. The processing of oldest to youngest instructions is shown from left to right in the diagram. Generally, over the duration of time, checkpoint events occur and accordingly, checkpoints are filled or created. The checkpoint events may occur when a passage of a given time is detected, such as when a counter reaches a given threshold. Alternatively, the checkpoint events may occur when a given number of instructions have been processed at a given pipeline stage. In other examples, the checkpoint events occur when a given number of instructions are deallocated or issued from a given data structure and/or from a given pipeline stage. In yet other examples, the checkpoint events occur when a given instruction type reaches a given pipeline stage, such as a control flow transfer instruction detected as having been decoded and ready to have registers renamed.

When a checkpoint event occurs, particular processor state information is stored or copied. The storing of the particular processor state information may be referred to as taking a snapshot of the processor state. The snapshot may include information used to recover an architectural state of the processor and restart execution after a speculative misprediction or an exception.

Multiple different types of checkpointing may be used in the processor. Conventional checkpointing, reorder buffer (ROB) checkpointing, register alias table (RAT) checkpointing, and checkpoint prediction may be used. In various embodiments, in-order checkpoint release may be used. With in-order checkpoint release, a given checkpoint remains valid until a corresponding control flow transfer instruction, such as a branch instruction, and all preceding control flow transfer instructions are resolved. In this manner, the storing of checkpoints may be implemented and managed as a circular buffer with a pointer. The control logic may be simplified, but in order to maintain good performance, a large number of checkpoints may be used and a large number of clock cycles may be used during recovery. In other embodiments, an out-of-order checkpoint release may be used. With out-of-order checkpoint release, a given checkpoint is released as soon as a corresponding control flow transfer instruction is resolved.

In FIG. 3, multiple instructions are being processed out-of-order. Here, a "processed instruction" may indicate the instruction has been decoded and sent to renaming logic. Alternatively, a "processed instruction" may indicate the instruction has been issued to an execution unit or a load/store unit. In yet other examples, a "processed instruction" may indicate the instruction has completed execution and is ready to retire. Other stages of pipeline processing of the instructions are possible and contemplated for selecting an indication of a "processed instruction". Allocated or filled checkpoints are indicated by checkpoint 302. An empty or yet to be allocated/filled checkpoint is indicated by checkpoint 304. A processed instruction is indicated by instruction 306. A yet to be processed or unprocessed instruction is indicated by instruction 308.

At time t1, a first checkpoint is shown as allocated or filled. No other checkpoint is yet allocated. Instructions are shown in program order from left to right. The second, fifth, seventh and ninth instructions are processed out-of-order. Although four instructions are shown between the checkpoints for illustrative purposes, any other number of instructions may be fetched and in the pipeline between checkpoints.

At time t2, the second checkpoint is allocated. Although the third checkpoint is shown as still unfilled, in some examples, the third checkpoint may have been allocated or filled in the duration between t1 and t2. The first, eighth and tenth instructions have been processed in the time duration between t1 and t2. In addition, a speculative misprediction or an exception occurs during the processing of the seventh instruction. The "X" over the seventh instruction indicates the speculative misprediction or exception. In some embodiments, the seventh instruction has been processed before the time t1, it is later found that a corresponding condition is resolved, and a prediction made during the processing is incorrect. In other examples, the seventh instruction has not yet been processed before time t1 and due to the processing of the seventh instruction, an exception occurs.

As a result of the misprediction or exception, a checkpoint that was allocated or filled earlier is selected. In the shown example, the second checkpoint (from left to right) is selected. The architectural state information stored in the second checkpoint is used to restart instruction processing. The restart, which may also be referred to as the rewind or the rollback, is shown at time t3.

At time t4, the instructions continue to be processed out-of-order and a third checkpoint is filled. In the illustrated example, a smaller number than four instructions are between the second and the third checkpoints. The smaller number is used to show the checkpoint events may cause a different number of instructions at a given stage of processing between filled checkpoints. In some embodiments, when each instruction between two checkpoints reaches a given stage of processing, the older checkpoint between the two checkpoints is deallocated or removed. For example, each instruction between the first and the second checkpoint has been processed. Accordingly, the first checkpoint may be removed (invalidated or deallocated).

Figure 4:
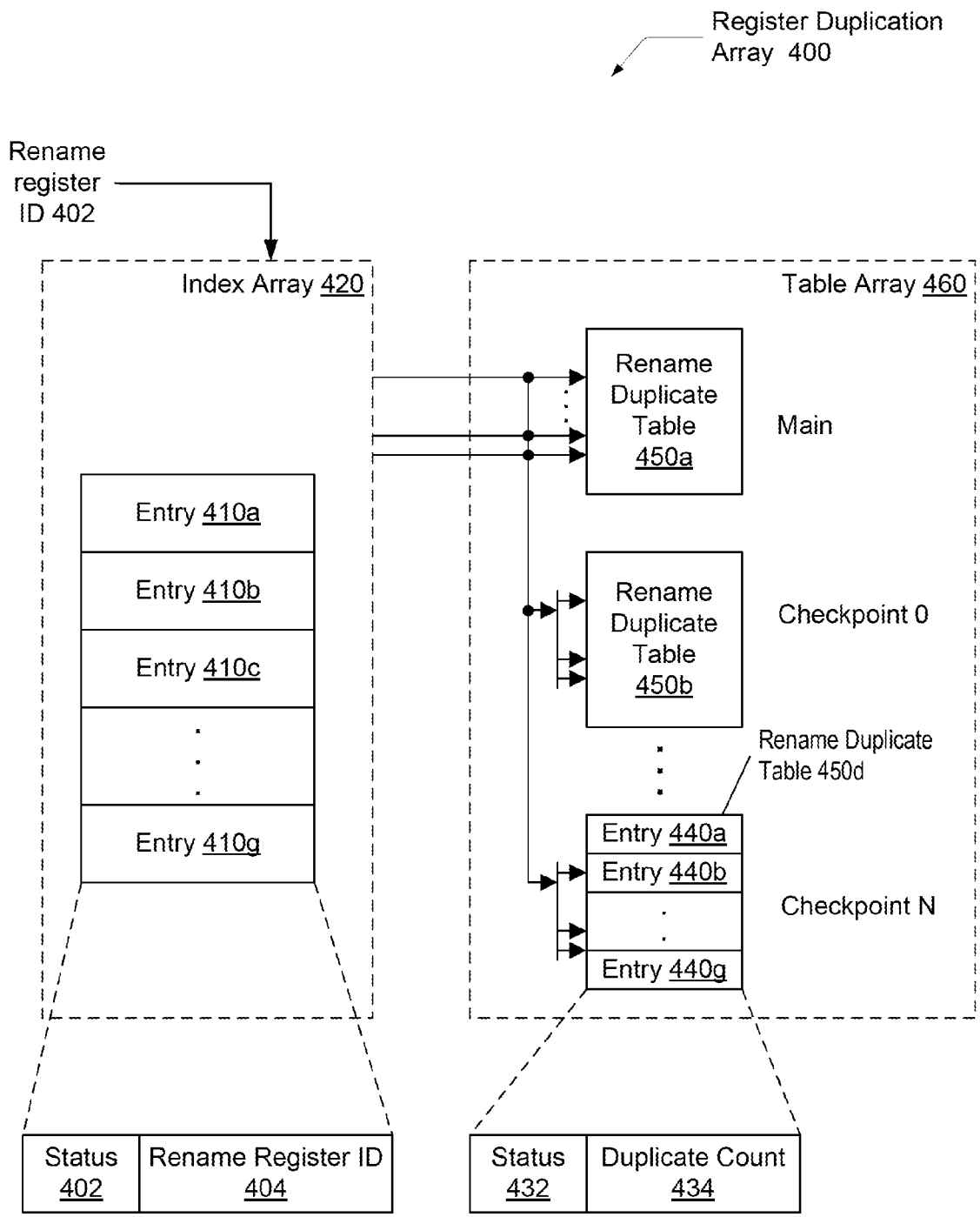
FIG. 4 is a generalized block diagram of another embodiment of a register duplicate array (RDA).

Referring now to FIG. 4, a generalized block diagram of one embodiment of a register duplicate array (RDA) 400 is shown. As shown, the RDA 400 includes an index array 420 and a separate table array 460. The index array 420 stores entries 410a-410g. The table array 460 stores multiple tables 450a-450d. One or more of the tables 450a-450d may be selected at a given point-in-time. When the index array 420 is searched and a match is found, the matching one of the entries 410a-410g may be used to select one of the entries 440a-440g in a corresponding table of the tables 450a-450d. In various embodiments, the index array 420 is a content addressable memory (CAM). The table array 460 may utilize flip-flops for storing data. By not storing the contents of the entries 410a-410g with the entries 440a-440g in the tables 450a-450d, the RDA 400 may consume less on-die real estate and less power consumption.

In various embodiments, the index array 420 is searched with a rename register identifier (ID) 402. As described earlier, the rename register ID 402 may also be referred to as a physical register number. Each of the entries 410a-410g may store a status field 403 and a rename register ID 404. The status field 403 may store at least a valid bit. The rename register ID 404 may store a rename register ID found to have mappings duplicated. The index array 420 may be searched when a rename register ID is being allocated, when a rename register ID is being mapped again, or when an instruction using the rename register ID is being committed or retired.

When a hit occurs during the search in the index array 420, the corresponding rename register ID is used to index into the table array 460. A checkpoint number (not shown) may also be used to index into the table array 460. One or more of the rename duplicate tables 450a-450d may be selected by the checkpoint number or another control signal. For example, each one of the rename duplicate tables 450a-450d storing valid information (has been allocated) may be selected. When an instruction utilizing a duplicated rename register ID is being committed or retired, the duplicate count may be decremented. Each one of the tables 450a-450d may be selected for the update. When a new checkpoint is being allocated, a single one of the tables 450b-450d may be selected for the allocation. When a new instruction causes a duplicate count to increment, such as a qualified move instruction, then only the single table 450a indicated as "Main" may be selected.

The rename register ID found from a hit in the index array 420 may be used to select a given one of the entries 440a-440g in a corresponding one of the tables 450a-450d. Each one of the entries 440a-440g may store at least a status field 432 and a duplicate count field 434. The status field 432 may store at least a valid bit. The duplicate count field 434 may store a duplicate count for a corresponding rename register ID.

The RDA 400 may be used to support both zero cycle move instructions and microarchitectural checkpointing. The move operation may be used frequently in function calls implemented as subroutines. Within a subroutine body, parameters and local variables may be located at constant offsets from the base pointer for the duration of the subroutine execution. The subroutine epilogue mirrors the subroutine prologue. The subroutine caller's register values are recovered from the stack, the local variables are deallocated by resetting the stack pointer, the subroutine caller's base pointer value is recovered, and the return instruction, ret, is used to return to the appropriate code location in the caller. At least the prologue and the epilogue of the subroutine utilize a register-to-register move operation. A simplified example of the use of a move operation within a subroutine is provided in the following code:

| SubExample: | // Start of subroutine |
|---|---|
|  | // Prologue |
| push bp | // Save the old base pointer |
| mov bp, sp | // Set the new base pointer |
| sub sp, n | // Reserve n bytes of local storage |
| push reg1 | // Save register values that the subroutine |
| push reg2 | // will modify |
|  | // Body |
|  | // do some processing |
|  | // Epilogue |
| pop reg2 | // Recover register values |
| pop reg1 |  |
| add sp, n | // Remove saved n bytes of storage |
| mov sp, bp | // Deallocate local variables |
| pop bp | // Restore the caller's base pointer |
| ret |  |

In the above example, the destination operand is listed first followed by the source operand. However, the opposite convention is possible and contemplated. As seen above, the subroutine utilizes at least two register-to-register move operations. The register-to-register move operations shown above affect the base pointer denoted by "bp" and the stack pointer denoted by "sp". In addition, the body of the subroutine may use register-to-register move operations. Machine code statistics may show a significant portion of code utilizes move operations, 2 operands and register operand types. In addition, register-to-register move operations may transfer data between general-purpose registers and specific-purpose registers. Three-dimensional graphics programs may use a single-instruction-multiple-data (SIMD) microarchitecture. The associated SIMD registers may be included in a general-purpose processor that supports multimedia extensions to its ISA. Alternatively, the SIMD registers may be included in a graphics processing unit (GPU). As described earlier, a microprocessor may include specific-purpose processor cores in addition to general-purpose processor cores.

A different mnemonic other than "mov" may be used to distinguish between a general-purpose register-to-register move operation, a general-purpose to specific-purpose register-to-register move operation, and a specific-purpose register-to-register move operation. The above-simplified examples illustrate some uses of the move operation and the potential for its high occurrence in assembly language code. In addition, these move operations typically include the read-after-write (RAW) data dependency, which cause serialization of instruction execution for associated source code segments, reducing throughput.

As briefly described earlier, control logic may convert a register-to-register move operation to a zero cycle move operation by assigning a given rename register number associated with the source operand of the move instruction to the destination operand of the move instruction. Each of the source operand and the destination operand are now mapped to a same rename register number. In addition, the control logic may mark the move instruction to prevent it from proceeding in the pipeline of the processor core. For example, the control logic may mark the given move instruction to indicate completion at the dispatch pipeline stage. Further, the value of the rename register number used for both the source and the destination operands may be bypassed to one or more instructions younger in program order than the move instruction.

Figure 5:
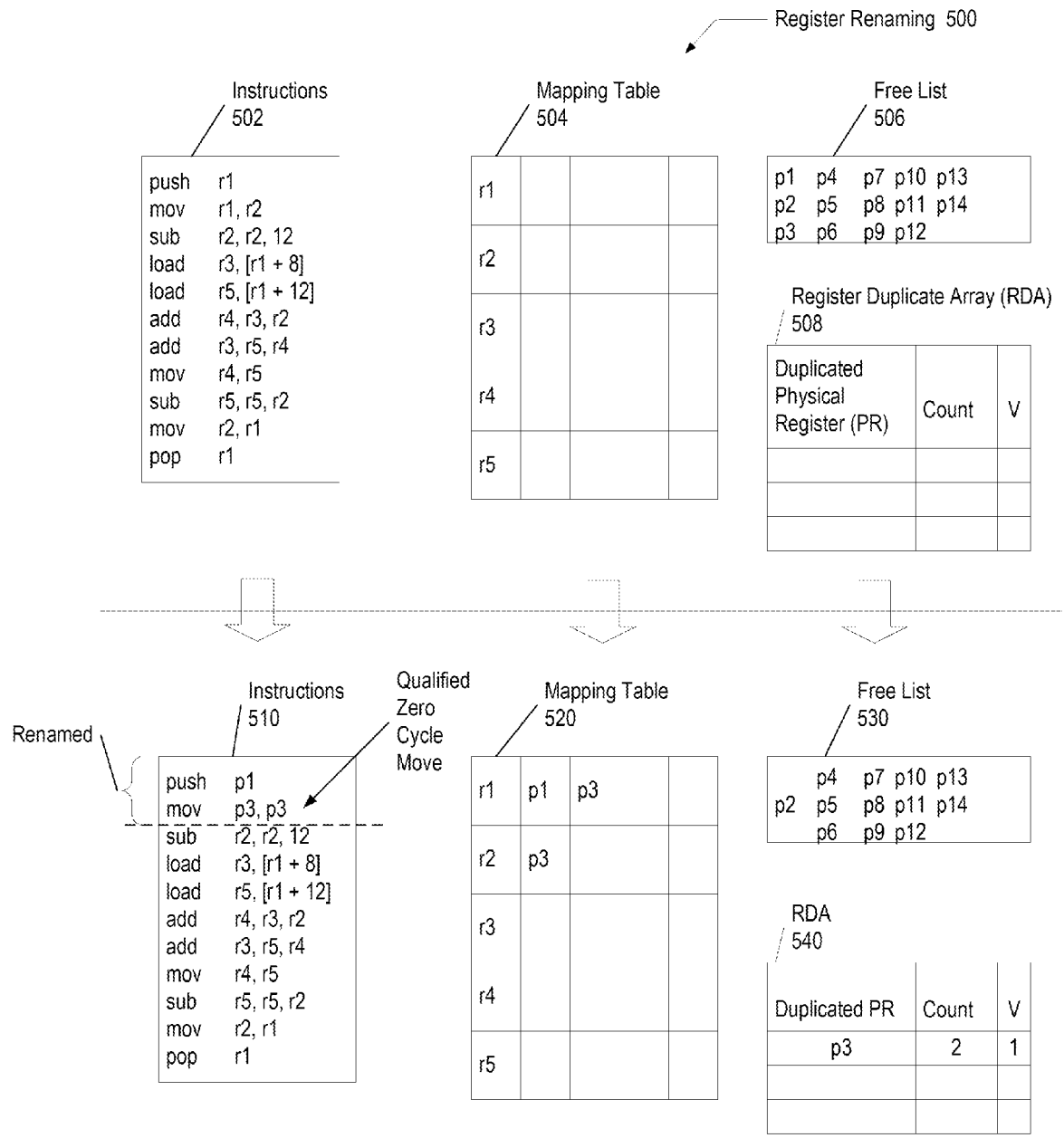
FIG. 5 is a generalized block diagram of one embodiment of register renaming with zero cycle move operations.

Turning now to FIG. 5, a generalized block diagram illustrating one embodiment of register renaming 500 with zero cycle move operations is shown. FIG. 5 generally depicts instructions 502, mapping table 504, and free list 506 before (upper portion of figure) and after (lower portion of figure) a rename operation. A simplified example of a subroutine includes the instructions 502. In this example, a destination operand is listed first after an instruction mnemonic followed by one or more source operands. Registers use the general nomenclature of "r" followed by a register identifier. For example, register 1 is denoted by "r1". Although data conversions may be performed and data transfers between general-purpose and specific-purpose registers may occur in addition to data transfers between a first specific-purpose register set and a second specific-purpose register set may occur, this example does not show these scenarios for ease of illustration. However, such data conversions and data transfers are possible and contemplated.

The instructions 502 are meant to be a pseudocode example and language agnostic. For example, the fourth and fifth instructions read contents of a memory into architectural registers r3 and r5. This type of operation may be performed with the general load instructions shown in the example. In a selected ISA, such as ARM, a particular read request instruction may be used. For the ARM ISA, a single register data transfer instruction may be used, such as "1dr r3, [r1, #8]". In other embodiments, a different ISA may be selected which uses a different instruction syntax.

As shown, the instructions 502 utilize the subroutine formats for a prologue, a body, and an epilogue. Although these formats are used here, other embodiments may utilize other formats. As shown, the instructions 502 utilize five registers labeled r1-r5. The mapping table 504 generally shows a data structure for storing mappings between architectural register numbers and physical register numbers. It is noted that while the discussion here uses register "numbers", other embodiments could use other types of identifiers to distinguish registers from one another. The free list 506 shows the physical register numbers available for renaming purposes. In this example, there are 14 physical register names using the general nomenclature of "p" followed by a register identifier. As such, free list 330a shows physical registers p1-p14 are available for register renaming.

In this example, a zero cycle move operation is shown and a register duplication array (RDA) is shown which stores an indication of duplicate mappings. An example of the RDA both prior to register renaming and once register renaming begins is shown as RDA 508 and RDA 540, respectively. The RDA 508 is empty prior to register renaming. The RDA 540 shows allocated entries as qualified zero cycle move operations are processed within the instructions. Further details of the RDA are provided below. Hardware support for duplicating the mapping for the source physical register may include a data structure for maintaining a duplicate count for the physical register. For example, RDA 540 is configured to maintain a duplicate count for multiple physical registers. As will be discussed further below, entries in RDA 540 may be allocated for a register-to-register move instruction with a source architectural register that has not already been renamed. However, if RDA 540 is already full, then duplication resources may not be available and no entry allocated.

Referring to the instructions 510, renaming has occurred for the first two instructions. The mapping table 520 stores the mappings for the first two instructions. Here, the register r1 is renamed to p1 for the push instruction. The second instruction, the mov instruction, qualifies to be converted to a zero cycle move operation. In one embodiment, one qualifier is the move operation is a register-to-register operation. Another qualifier is there exists support to store duplicate renaming mappings. For the mov instruction, the destination operand (r1) is renamed to a register rename number used for the source operand. The source operand, or register r2, is renamed to p3. Therefore, the destination operand, or register r1, is also renamed to p3. The free list 530 shows that the physical registers p1 and p3 are no longer available for mappings. However, as will be discussed more fully below, the physical register p3 may be reused despite not being in the free list 530.

The mappings for the first two instructions are shown in the mapping table 520. As shown, the physical register number p3 is mapped twice—once for architectural register r2 and once for architectural register r1. This is a duplicate mapping. The register duplication array (RDA) 540 stores an indication of the duplicate mapping. For example, an entry in the RDA 540 stores an identifier of the duplicated physical register, p3, and an associated duplicate count for the duplicated physical register. A valid bit (V) may be used to indicate a valid allocated entry. This entry stores a duplicate count value of 2, since the physical register p3 has two mappings shown in the mapping table 520.

Figure 6:
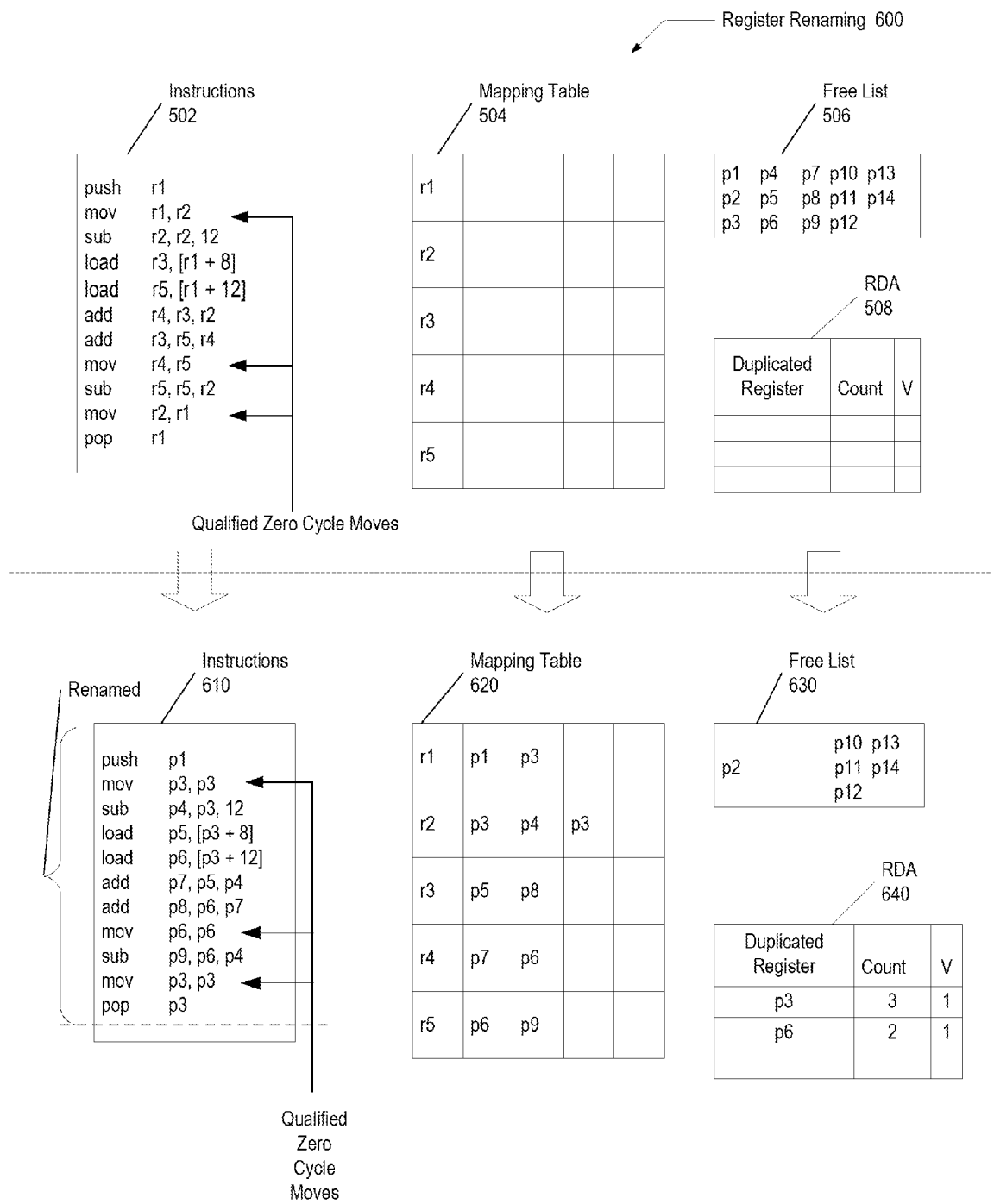
FIG. 6 is a generalized block diagram of another embodiment of register renaming with zero cycle move operations.

Turning now to FIG. 6, a generalized block diagram of continued register renaming 600 of the example with zero cycle move operations presented in FIG. 5 is shown. The example shown in the continued register renaming 600 utilizes the instructions 502 from the example shown in FIG. 5.

The mapping table 504 and the free list 506 are also from the example shown in FIG. 5. FIG. 6 shows mapping table 620 with the stored mappings between architectural register numbers and physical register numbers after renaming of all of the instructions in the example. The free list 630 shows physical registers p2 and p10-p14 are still available after each one of the instructions 610 have been renamed. The physical registers p1 and p3-p9 have been used to rename architectural registers r1-r5 in the instructions 610.

Using the second mov instruction as an example, this instruction is a register-to-register operation that qualifies to be converted to a zero cycle move operation and the destination operand (r4) is renamed to the register name used for the source operand. As the source operand (r5) has been renamed to p6 (as will be discussed below), the destination operand (r4) is also renamed to p6. In this example, the register p6 was not in the free list 630 by the time registers for the second mov instruction were being renamed. The physical register p6 was previously mapped to r5 during processing of the second load instruction. However, at the time of processing the second mov instruction, the RDA 640 is able to maintain duplicate mapping information for the physical register p6. In one embodiment, duplicate mapping information may include a physical register identifier and an associated duplicate mapping count stored in an allocated entry. In one embodiment, the duplication count for each of the physical registers may be represented by a particular number of bits (e.g., five bits). In such an embodiment, once the count reaches a maximum value (e.g., 31 for five bits), the duplication count may be deemed saturated an no further duplications available for that register. In the example shown, p6 is not saturated and further duplication is possible.

In the example of FIG. 6, the third mov instruction also qualifies to be converted to a zero cycle move operation. For the third mov instruction, the destination operand, r2, is renamed to a register name used for the source operand. The source operand, r1, has already been renamed to p3. Therefore, the destination operand, r2, is also renamed to p3. Similar to the above, the physical register p3 was not in the free list 630 by the time the third mov instruction was being renamed. The physical register p3 was previously mapped to each of r1 and r2 during processing of the first mov instruction. However, at the time of processing the third mov instruction, the RDA 640 is able to continue maintenance of duplicate mapping information for the physical register p3. When the third mov instruction is processed, an associated entry in the RDA 640 has already been allocated and the duplicate count for the physical registers p3 is not saturated. Therefore, the duplicate count stored in the RDA 640 for the physical register p3 is updated. For example, the duplicate count is incremented from 2 to 3.

Figure 7:
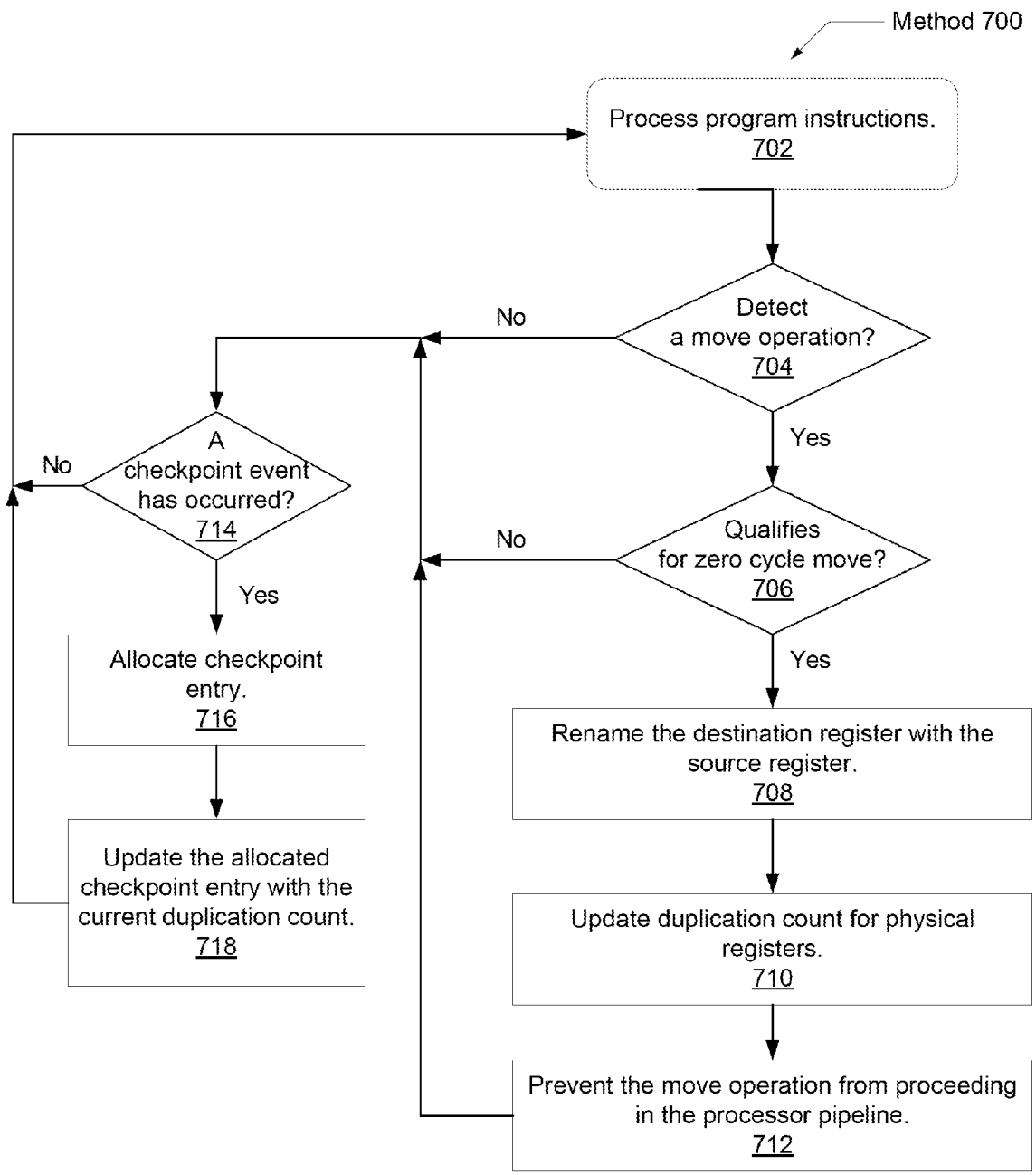
FIG. 7 is a generalized flow diagram illustrating one embodiment of a method for creating zero cycle move operations.

Referring now to FIG. 7, a generalized flow diagram of one embodiment of a method 700 for creating zero cycle move operations is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 702, program instructions are processed. The instructions may be compiled, fetched from memory, decoded and executed. After decoding, if a given instruction is detected to be a move operation (conditional block 704), then a determination may be made as to whether the move operation qualifies to be a zero cycle move operation. One qualifier may be the move operation is a register-to-register move instruction. Another qualifier may be whether the hardware currently is able to maintain duplicate mapping information for the move operation. For example, in one embodiment, a data structure, such as the RDA 640, may be used. The RDA may utilize the organization shown in FIG. 4 for RDA 400. If the RDA 640 has an available entry and a duplicate count within this entry is not already saturated, then the move operation may qualify to be converted to a zero cycle move operation.

If the move operation qualifies to be converted to a zero cycle move operation (conditional block 706), then in block 708 the destination operand is renamed with a same physical register identifier as the source operand. If an entry in the RDA 640 is not already allocated for this particular physical register number, and the RDA 640 is not already full, then an entry may be allocated for this physical register. In various embodiments, the organization shown in FIG. 4 for RDA 400 may be used. An available entry of the entries 410a-410g may be allocated. The status field 403 may be updated with from an indication of an invalid entry to an indication of a valid entry. The rename register ID field 404 may be updated with the physical register ID used for the mapping. A corresponding entry in the rename duplicate table 450a may be allocated and updated with the current duplicate count.

In block 710, RDA 640 is updated with a duplication count for the physical register. The duplicate count may be incremented each time a given architectural register currently not mapped to the rename register is mapped to the rename register. Referring again to FIG. 5 and FIG. 6, the duplicate count for the physical register p3 is incremented by one for the fifth mov instruction. In one embodiment, the duplicate count may be initialized with a value of two. However, other embodiments are possible and are contemplated. In a case where the initial value is 2, the duplicate count for p3 is incremented to 3.

In block 712, the mov instruction may be marked (or an indication otherwise stored) in a manner to prevent it from being processed in the pipeline in an ordinary manner. Rather, in one example, the mov instruction is marked as complete at a dispatch pipeline stage. Therefore, the mov instruction consumes zero pipe stages and clock cycles for execution. In other examples, the mov instruction is marked as complete in another pipeline stage that is prior to an execution pipeline stage. As done with other renamed architectural registers, the physical register selected for renaming both the destination and the source operands may be bypassed to younger in-program-order instructions that have a data dependency on the mov instruction.

If a checkpoint event has occurred (conditional block 714), then in block 716, entries within the RDA 640 may be allocated for a new checkpoint. In various embodiments, the organization shown in FIG. 4 for RDA 400 may be used. An available table of the tables 450a-450d may be selected. One or more entries of the entries 440a-440g in the selected table of the tables 450a-450d may have its respective status field 432 updated from an indication of an invalid entry to an indication of a valid entry. In block 718, the one or more entries in the selected table may have its duplicate count field 434 updated with a duplicate count stored in the table 450a. For example, the physical register number "p3" may have a table of the tables 450a-450d corresponding to Checkpoint #4 selected. Entry 440b in the selected table may have its duplicate count field 434 updated with the duplicate count stored in entry 440b of table 450a.

Figure 8:
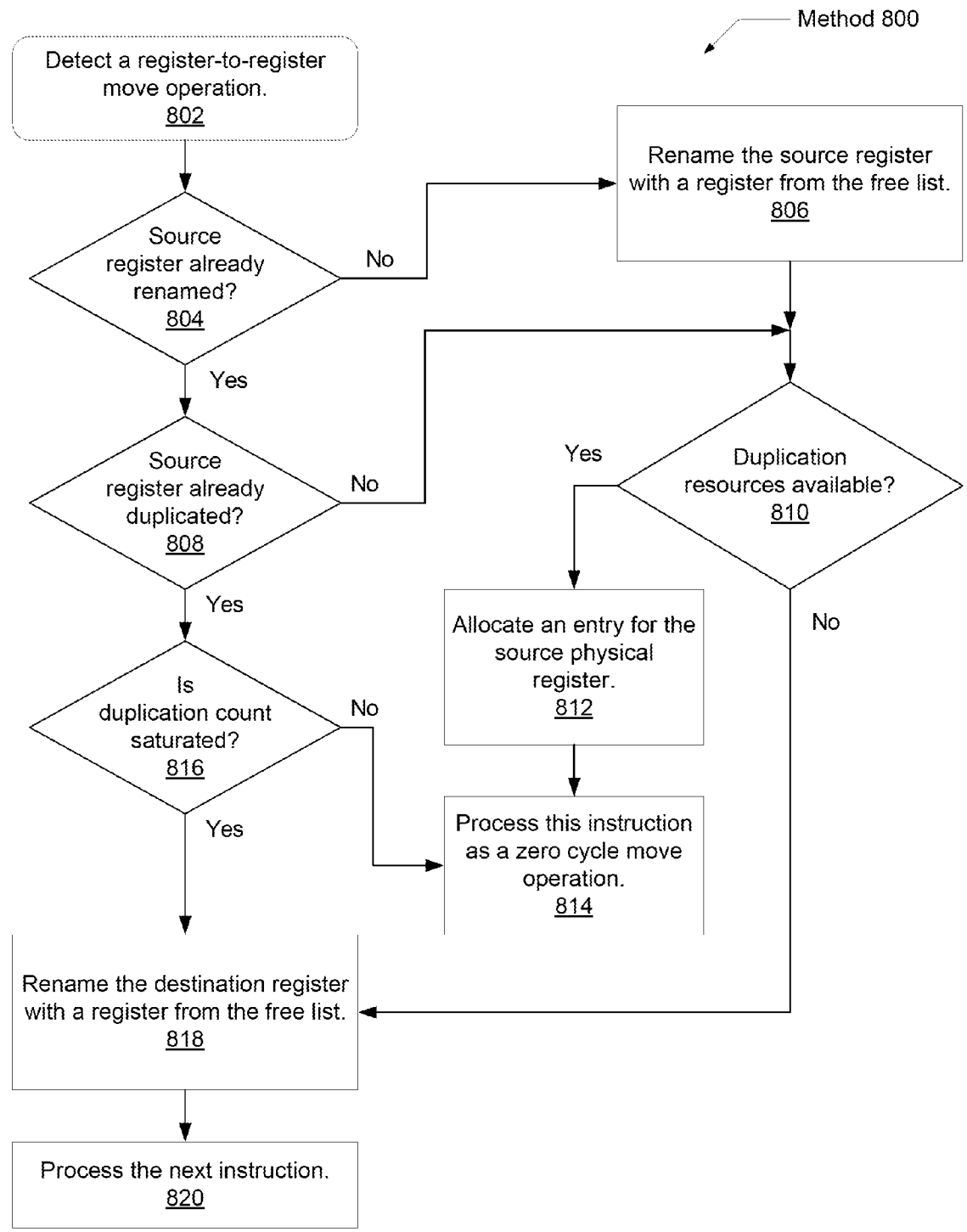
FIG. 8 is a generalized flow diagram illustrating another embodiment of a method for determining qualification for instruction conversion to zero cycle move operations.

Referring now to FIG. 8, a generalized flow diagram of one embodiment of a method 800 for determining qualification for instruction conversion to zero cycle move operations is shown. In block 802, a given instruction is detected to be a register-to-register move operation. A determination is then made as to whether the source register has already been renamed (conditional block 804). For example, an access of the mapping table 620 may determine whether the source architectural register has already been renamed. If the source architectural register has not already been renamed (conditional block 804), then in block 806 the source architectural register is renamed with a physical register from the free list. It is noted that in various embodiments, all architectural registers are renamed. In which case, one or both of blocks 804 and 806 may be unnecessary. Various such embodiments are possible and are contemplated.

If in conditional block 810 it is determined there are no further duplication resources available (e.g., if the RDA 640 is full and all entries have been allocated), then in block 818 the destination architectural register is renamed with a physical register number from the free list. The renamed identifiers, an associated program counter (PC) value, dependency vectors, and so forth may be sent to a dispatch queue and later to a scheduler. In block 820, a next available instruction may be processed. The next available instruction may be processed in parallel with the above steps or in a subsequent clock cycle. If duplication resources are available (conditional block 810), then in block 812 an entry may be allocated (e.g., in the RDA) for the source physical register and in block 814 this particular instruction may be processed as a zero cycle move operation. For example, the steps described in blocks 708-712 in method 700 may be used.

If in block 804 the source architectural register of the register-to-register move instruction is already renamed, then a determination may be made as to whether the corresponding renamed register number has been duplicated. For example, the physical register number may be used to index into a data structure such as the RDA 640. A hit in the RDA may indicate the source physical register is already duplicated. A miss may indicate the source physical register is not already duplicated. If the source physical register is not already duplicated (conditional block 808), then control flow of method 800 moves to conditional block 810. Otherwise, a duplicate count for the renamed source physical register may be compared to a given threshold. In one embodiment, the threshold may correspond to some particular a count. If an associated duplicate count has not reached the threshold (conditional block 816), then control flow of method 800 moves to block 814. If the associated duplicate count has reached the threshold (conditional block 816), then control flow of method 800 moves to block 818.

Figure 9:
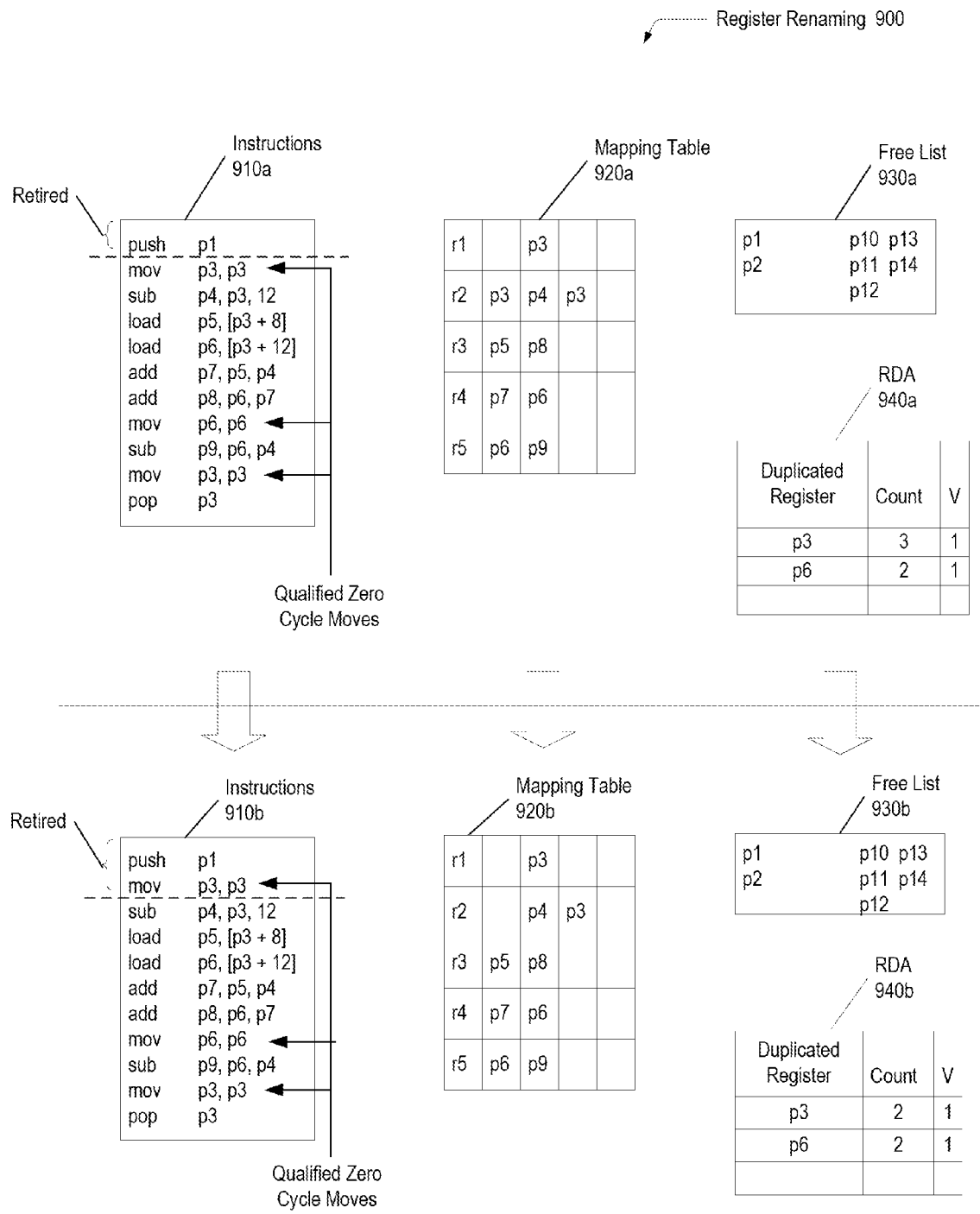
FIG. 9 is a generalized block diagram of one embodiment of register renaming during retirement of code with zero cycle move operations.

Turning now to FIG. 9, a generalized block diagram illustrating one embodiment of register renaming 900 during retirement of instructions with zero cycle move operations is shown. The example shown in FIG. 9 is a continuation of the example shown in FIG. 6. Here, renaming has completed and now instructions are being retired in-order. The instructions 910*a* are the same as instructions 610, which are the instructions 310*a* after each instruction has operands renamed.

The mapping table 920*a* and the free list 930*a* have the same values as the mapping table 620 and the free list 630, respectively, except for updates corresponding to the first instruction being retired. The mapping table 920*a* shows the stored mappings between architectural register numbers and physical register numbers after the first instruction has been retired. The physical register p1 mapped to the architectural register r1 has been removed from the mapping table 920*a* and returned to the free list 930*a*.

Referring to the instructions 910*b*, the first two instructions, including the first zero cycle mov instruction, have been retired. Selecting a given number of instructions as retired is done for illustrative purposes and does not determine the retirement process by indicating a number of instructions being simultaneously retired in a given pipeline stage. Any number of instructions per pipeline stage may be chosen for simultaneous retirement and depends on a particular microarchitecture. In addition to the physical register p1 being removed from the mapping table 920*b*, the physical register p3 is removed from one entry in the mapping table 920*b*.

The oldest mapping between the physical register p3 and the architectural register r2 is removed from the mapping table 920*b*. The use of r2 as a renamed register p4 occurs in the next instruction, so the current mapping, which is the oldest mapping, to p3 is no longer utilized for r2. However, the younger mapping between the registers r2 and p3 remains. In addition, the mapping between the physical register p3 and the architectural register r1 remains. Therefore, the physical register p3 still has two mappings within the mapping table 920*b*, and thus, the physical register p3 is not returned to the free list 930*b*.

The RDA 940*b* is updated with the current number of mappings for the physical register p3, which are 2 mappings. The duplicate count for the physical register p3 is decremented. Generally, a duplicate count is decremented each time an associated rename register number is ready to return to the free list for any given architectural register. A rename register number may be determined to be ready to return to the free list in response to a mapping is removed from the mapping table. Typically, a rename register number is returned to the free list in response to a mapping is removed from the mapping table. However, with duplicate mappings in the mapping table due to zero cycle move operations, the RDA 940*b* may be inspected prior to any return to the free list.

In one embodiment, in response to a given duplicate count decreases to one, the duplicate count and the associated duplicate mappings may no longer be stored in the RDA 940*b*. When a given rename register number is a candidate to return to the free list 930*b* during an associated instruction commit, and no associated duplicate information is found to be stored in the RDA 940*b*, the rename register number is returned to the free list 930*b*. In another embodiment, in response to a given duplicate count decreases to one, the duplicate count and the associated duplicate mappings may still be stored in a valid entry in the RDA 940*b*. When a given rename register number is a candidate to return to the free list 930*b* during an associated instruction commit, and associated duplicate information is found in the RDA 940*b* with a duplicate count of one, the rename register number is returned to the free list 930*b*. In addition, the duplicate count may be decremented to zero. Alternatively, the entry in the RDA 940*b* may be invalidated.

Figure 10:
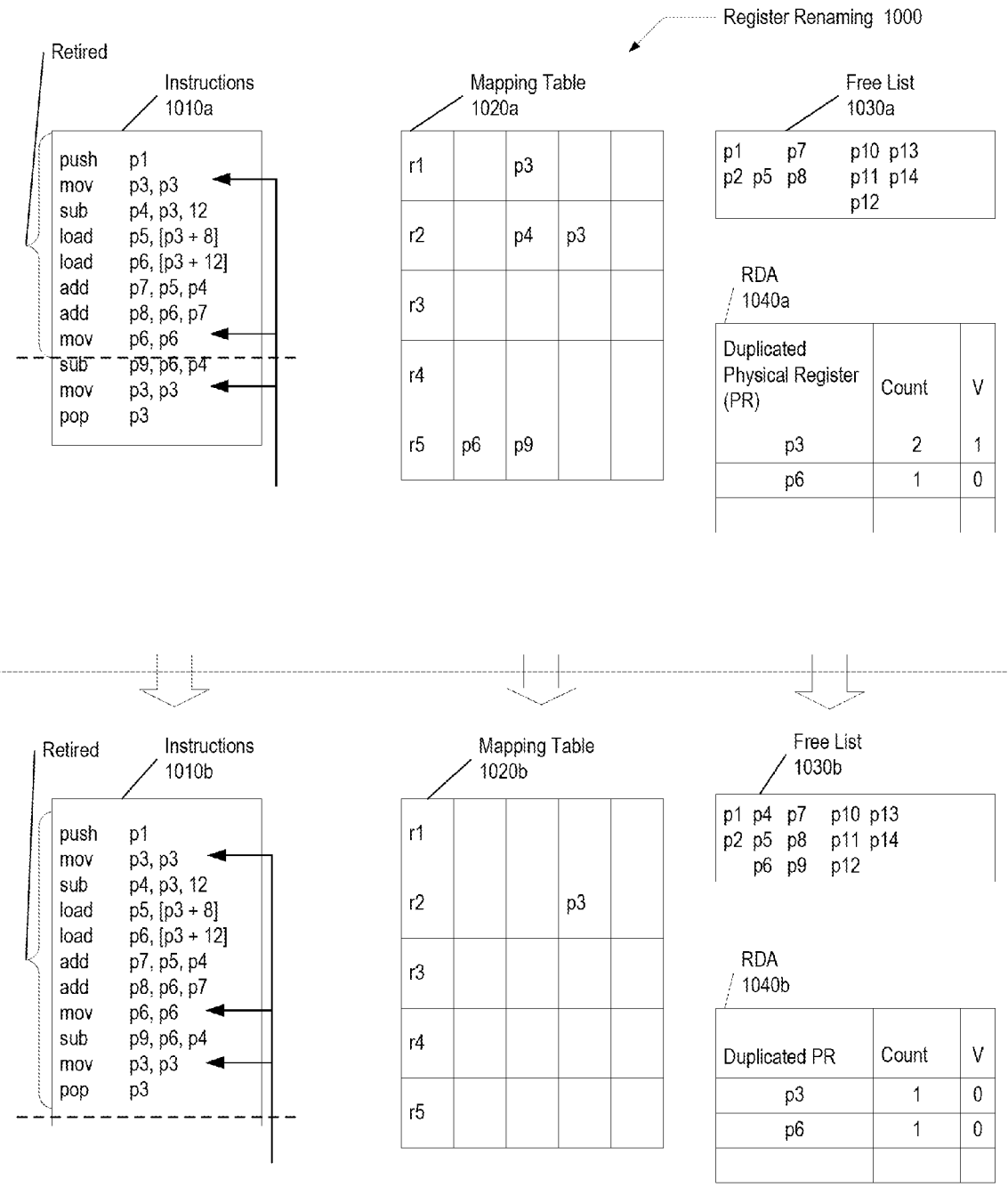
FIG. 10 is a generalized block diagram of another embodiment of register renaming during retirement of code with zero cycle move operations.

Referring now to FIG. 10, a generalized block diagram illustrating another embodiment of register renaming 1000 during retirement of code with zero cycle move operations is shown. The example shown in the register renaming 1000 is a continuation of the example shown in the register renaming 900. Referring to the instructions 1010*a*, these instructions are the same as the instructions 920*b*, however, retirement has occurred for all but the last three instructions.

The mapping table 1020*a* shows the stored mappings between architectural register numbers and physical register numbers after all but three instructions have retired. The free list 1030*a* shows physical registers p1-p2, p5, p7-p8, and p10-p14 are available for mappings at this point. The physical registers p3, p4, p6 and p9 are still being used to rename architectural registers r1, r2 and r5 in the instructions 1010*a*.

The youngest mapping for the physical register p6, which occurred for the second mov instruction and for the architectural register r4, is removed from the mapping table 1020*a*. The oldest mapping for the physical register p6, which occurred for the second load instruction and for the architectural register r5, remains in the mapping table 1020*a*. Therefore, the physical register p6 still has one mapping within the mapping table 1020*a*, and thus, the physical register p6 is not returned to the free list 1030*a*. The RDA 1040*a* is updated with the current number of mappings for the physical register p6, which is 1 mapping. The duplicate count for the physical register p6 is decremented from two to one. Again, a duplicate count may be decremented each time an associated rename register number is ready to return to the free list for any given architectural register.

In one embodiment, in response to a given duplicate count decreasing to one, such as the case for physical register p6, the duplicate count and the associated duplicate mappings may no longer be stored in the RDA 1040*a*. The entry in the RDA 1040*a* may be invalidated. When a given rename register number is a candidate to return to the free list 1030*a* during an associated instruction commit, and no associated duplicate information is found to be stored in the RDA 1040*a*, the rename register number is returned to the free list 1030*a*. In another embodiment, in response to a given duplicate count decreasing to one, such as the case for physical register p6, the duplicate count and the associated duplicate mappings may still be stored in a valid entry in the RDA 1040*a*. When a given rename register number is a candidate to return to the free list 1030*a* during an associated instruction commit, and associated duplicate information is found in the RDA 1040*a* with a duplicate count of one, the rename register number is returned to the free list 1030*a*. In addition, the duplicate count may be decremented to zero. Alternatively, the entry in the RDA 1040*a* may be invalidated. In the example shown in FIG. 10, the duplicate count for physical register p6 is decremented from 2 to 1, and the associated entry in the RDA 1040*a* is invalidated.

Referring to the instructions 1010*b*, these instructions are the same as the instructions 1010*a*, however, instruction commit has occurred for each of the instructions. In one embodiment, instruction commit and instruction retirement occur in a same pipeline stage. In other embodiments, results are committed in a first pipeline stage and the associated instruction is retired and removed from a retirement window in a later second pipeline stage. For purposes of returning physical register numbers to a free list and updating a data structure, such as the RDA 1040*b*, the actions may take place when the instruction commits.

The mapping table 1020*b* shows a mapping still exists between the physical register p3 and the architectural register r2. In one embodiment, this mapping may remain until the architectural register r2 is used again as a destination operand in subsequent code that is not shown. For example, other code or another subroutine may be called afterward and the value stored in the architectural register r2 may be used. In another embodiment, the mapping may be removed when a subsequent ret instruction (not shown) is committed. In yet another embodiment, the mapping may be removed when the pop instruction is committed. In such a cases, the mapping table 1020*b* would be empty. The free list 1030*b* currently shows all physical register numbers except p3 are available for renaming. However, in the cases that the mapping between the physical register p3 and the architectural register r2 is removed, the free list 1030*b* would show all physical register numbers p1-p14 are available for renaming.

When the last mov instruction is committed, the physical register p3 may not become a candidate for returning to the free list 1030*b*. The architectural register r2, which is used as a destination operand for the last mov instruction, may be used in later code. The architectural register r1, which is used as a source operand for the last mov instruction, is used in the subsequent pop instruction. Therefore, for this case, the physical register p3 may not yet become a candidate for returning to the free list 1030*b*. Consequently, the RDA 1040*b* may not be indexed by the physical register p3.

When the last instruction, which is the pop instruction, is committed, the physical register p3 may become a candidate for returning to the free list 1030*b*. The mapping between the physical register p3 and the architectural register r1 may be removed from the mapping table 1020*b*. The RDA 1040*b* may be indexed with the value of the physical register number p3 and a valid entry is found with a duplicate count of two. The duplicate count may be decremented from two to one.

As described earlier, a duplicate count is decremented each time an associated rename register number is ready to return to the free list for any given architectural register. A rename register number may be determined to be ready to return to the free list in response to a mapping is removed from the mapping table. In the case of the last instruction, which is the pop instruction, the mapping between the physical register p3 and the architectural register r1 is removed from the mapping table 1020*b*. Typically, a rename register number is returned to the free list in response to a mapping is removed from the mapping table. However, with duplicate mappings in the mapping table due to zero cycle move operations, the RDA 1040*b* may be inspected prior to any return to the free list.

In the example shown, the duplicate count for the physical register p3 is decremented from 2 to 1 and the associated entry is invalidated. Therefore, when a subsequent instruction commits that causes the mapping between the physical register p3 and the architectural register r2 to be removed from the mapping table 1020*b*, no valid entry will be found in the RDA 1040*b*, and the physical register p3 may be returned to the free list 1030*b*. Alternatively, the duplicate count for the physical register p3 is decremented from 2 to 1 and the associated entry may remain valid. Therefore, when a subsequent instruction commits that causes the mapping between the physical register p3 and the architectural register r2 to be removed from the mapping table 1020*b*, a valid entry will be found in the RDA 1040*b* with a duplicate count of one, and the physical register p3 may be returned to the free list 1030*b*.

Figure 11:
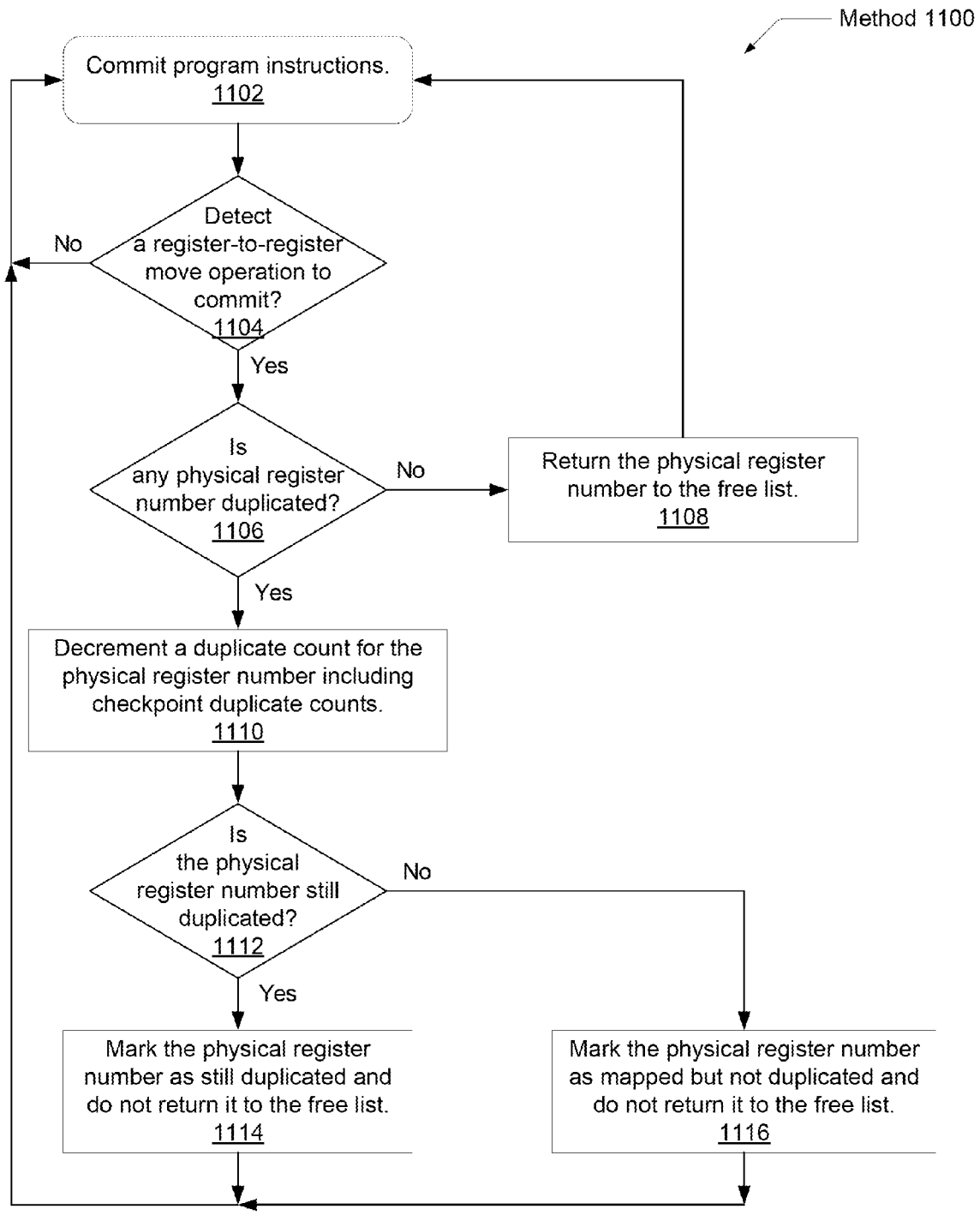
FIG. 11 is a generalized flow diagram illustrating one embodiment of a method for committing instructions that include zero cycle move operations.

Referring now to FIG. 11, a generalized flow diagram of one embodiment of a method 1100 for committing instructions that include zero cycle move operations is shown. In block 1102, program instructions are being committed. An in-order window of instructions within a data structure may be used to determine when to commit and retire instructions. For example, a reorder buffer (ROB) may be used as the data structure. If an instruction to commit is detected to be a register-to-register move operation (conditional block 1104), then a check may be performed to determine whether both the destination physical register and the source physical register is duplicated, the destination physical register is not duplicated, but the source physical register is duplicated; or neither the destination physical register nor the source physical register is duplicated. In one example, an associated duplicate flag or field indicating a status of duplication for each of the destination and the source physical registers may be stored with other associated information for the instruction.

In another example of determining whether a physical register is duplicated at a commit pipe stage, a comparison and resulting match between the source physical register and the destination physical register may determine each of the destination and the source physical register is duplicated. In this case, the destination and the source physical register number is the same value. In yet another example, each of the destination and the source physical register may be used to index into a data structure such as the RDA 640. A hit may indicate a corresponding physical register is already duplicated. A miss may indicate the corresponding physical register is not already duplicated. For a corresponding physical register, if the physical register number used for renaming is not duplicated (conditional block 1106), then in block 1108, the physical register number is returned to the free list. Otherwise, in block 1110, a duplicate count for the corresponding physical register number may be decremented. Generally, a duplicate count is decremented each time an associated physical register number is ready to return to the free list for any given architectural register. A rename register number may be determined to be ready to return to the free list in response to a mapping is removed from the mapping table. Typically, a rename register number is returned to the free list in response to a mapping is removed from the mapping table. However, with duplicate mappings in the mapping table due to zero cycle move operations, a data structure, such as the RDA, may be inspected prior to any return to the free list.

In various embodiments, the organization shown in FIG. 4 for RDA 400 may be used. Each valid (allocated) table of the tables 450a-450d may be selected. The one or more entries in the selected tables may have its duplicate count field 434 decremented. For example, the physical register number "p3" may have each allocated table of the tables 450a-450d selected. Entry 440b in the selected tables may have its duplicate count field 434 decremented. Each of the "main" duplicate count in table 450a and any valid checkpoint duplicate counts in tables 450b-450d is each decremented.

After the duplicate count is decremented, if the physical register number is still duplicated (conditional block 1112), then in block 1114, the physical register number may be marked as still duplicated and it is not returned to the free list. For example, a valid entry in a data structure, such as the RDA, may still be present with a duplicate count greater than one. In another example, using the RDA 400 shown in FIG. 4, the "main" duplicate count stored in table 450a may still have a valid entry with a duplicate count greater than one. Additionally, one or more of the tables 450b-450d may also have a valid entry with a duplicate count greater than one. After the duplicate count is decremented, if the physical register number is not still duplicated (conditional block 1112), then in block 1116, the physical register number may be marked as mapped but not duplicated. For example, an associated entry in a data structure, such as the RDA, may be invalidated. Alternatively, a valid entry may still be present with a duplicate count of one. The physical register number is not returned to the free list. Again, in various embodiments, the organization shown in FIG. 4 for RDA 400 may be used. When the physical register number is mapped but not duplicated, a valid entry in any one of the tables 450a-450d may be invalidated. Alternatively, a valid entry in any one of the tables 450a-450d may still be present with a duplicate count of one.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a decoder configured to decode fetched instructions;
a register rename unit; and
wherein the register rename unit is configured to:
receive decoded instructions;
determine to duplicate renaming assignments for a rename register identifier (ID) corresponding to a decoded move instruction;
allocate a plurality of entries corresponding to the given rename register ID;
maintain a duplicate count in at least a first entry of the plurality of entries for the given rename register ID;
wherein the given rename register ID is not stored in the plurality of entries; and
wherein when a first checkpoint event has occurred:
allocate a given entry of the plurality of entries different from the first entry; and
update the given entry with information stored in the first entry.

2. The processor as recited in claim 1, wherein a plurality of rename register IDs are stored in a content addressable memory (CAM) and the corresponding plurality of entries are stored in a data structure different from the CAM.

3. The processor as recited in claim 1, wherein each of the plurality of entries is configured to store at least a valid field and a respective duplicate count for the given rename register ID.

4. The processor as recited in claim 3, wherein the register rename unit is further configured to decrement a respective duplicate count in each of the plurality of entries each time an instruction using the given rename register ID commits.

5. The processor as recited in claim 3, wherein the register rename unit is further configured to increment a respective duplicate count in only said first entry each time any given architectural register currently not mapped to the given rename register ID is mapped to the given rename register ID.

6. The processor as recited in claim 3, wherein the register rename unit is further configured to deallocate the given entry of the plurality of entries different from the first entry when a given instruction retires, wherein the given instruction is younger than a second checkpoint event subsequent to the first checkpoint event corresponding to the given entry.

7. The processor as recited in claim 3, wherein when both source and destination operands of a decoded move instruction corresponding to the given rename register ID are registers, the register rename unit is further configured to:
assign the given rename register ID associated with a source operand of the move instruction to a destination operand of the move instruction; and
indicate the move instruction has been completed to prevent the move instruction from proceeding in the pipeline.

8. The processor as recited in claim 7, wherein the register rename unit is further configured to:

detect the move instruction is ready to commit; and prevent the given rename register ID from returning to a free list when the respective duplicate count in the first entry is greater than one.

9. The processor as recited in claim 7, wherein when the respective duplicate count in the first entry is one, the register rename unit is further configured to deallocate the given rename register ID from the CAM.

10. A method comprising:

decoding fetched instructions;

determining to duplicate renaming assignments for a rename register identifier (ID) corresponding to a decoded move instruction;

allocating a plurality of entries corresponding to the given rename register ID; and maintaining a duplicate count in at least a first entry of the plurality of entries for the given rename register ID;

wherein the given rename register ID is not stored in the plurality of entries; and when a first checkpoint event has occurred:

allocating a given entry of the plurality of entries different from the first entry; and updating the given entry with information stored in the first entry.

11. The method as recited in claim 10, further comprising storing a plurality of rename register IDs in a content addressable memory (CAM) and the corresponding plurality of entries in a data structure different from the CAM.

12. The method as recited in claim 10, further comprising:

decrementing a respective duplicate count in each of the plurality of entries each time an instruction using the given rename register ID commits; and incrementing a respective duplicate count in only said first entry each time any given architectural register currently not mapped to the given rename register ID is mapped to the given rename register ID.

13. A register rename unit comprising:

a first interface configured to receive decoded instructions;

a second interface to a dispatch unit configured to dispatch instructions to a scheduler; and control logic; and wherein the control logic is configured to:

determine to duplicate renaming assignments for a rename register identifier (ID) corresponding to a decoded move instruction;

allocate a plurality of entries corresponding to the given rename register ID; and maintain a duplicate count in at least a first entry of the plurality of entries for the given rename register ID;

wherein the given rename register ID is not stored in the plurality of entries; and when a first checkpoint event has occurred:

allocate a given entry of the plurality of entries different from the first entry; and update the given entry with information stored in the first entry.

14. The register rename unit as recited in claim 13, wherein a plurality of rename register IDs are stored in a content addressable memory (CAM) and the corresponding plurality of entries are stored in a data structure different from the CAM.

* * * * *